Feb. 22, 1944.                H. W. HUNTER                    2,342,344
              LOADING PLATFORM FOR LOG-TRUCKING OPERATIONS
                      Filed May 6, 1942           4 Sheets-Sheet 1
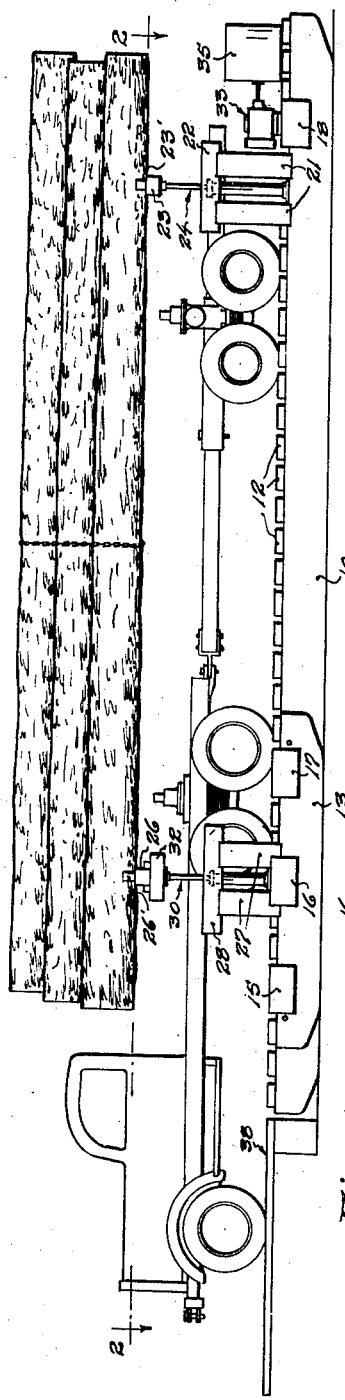
INVENTOR.
Harold W. Hunter
ATTORNEY.

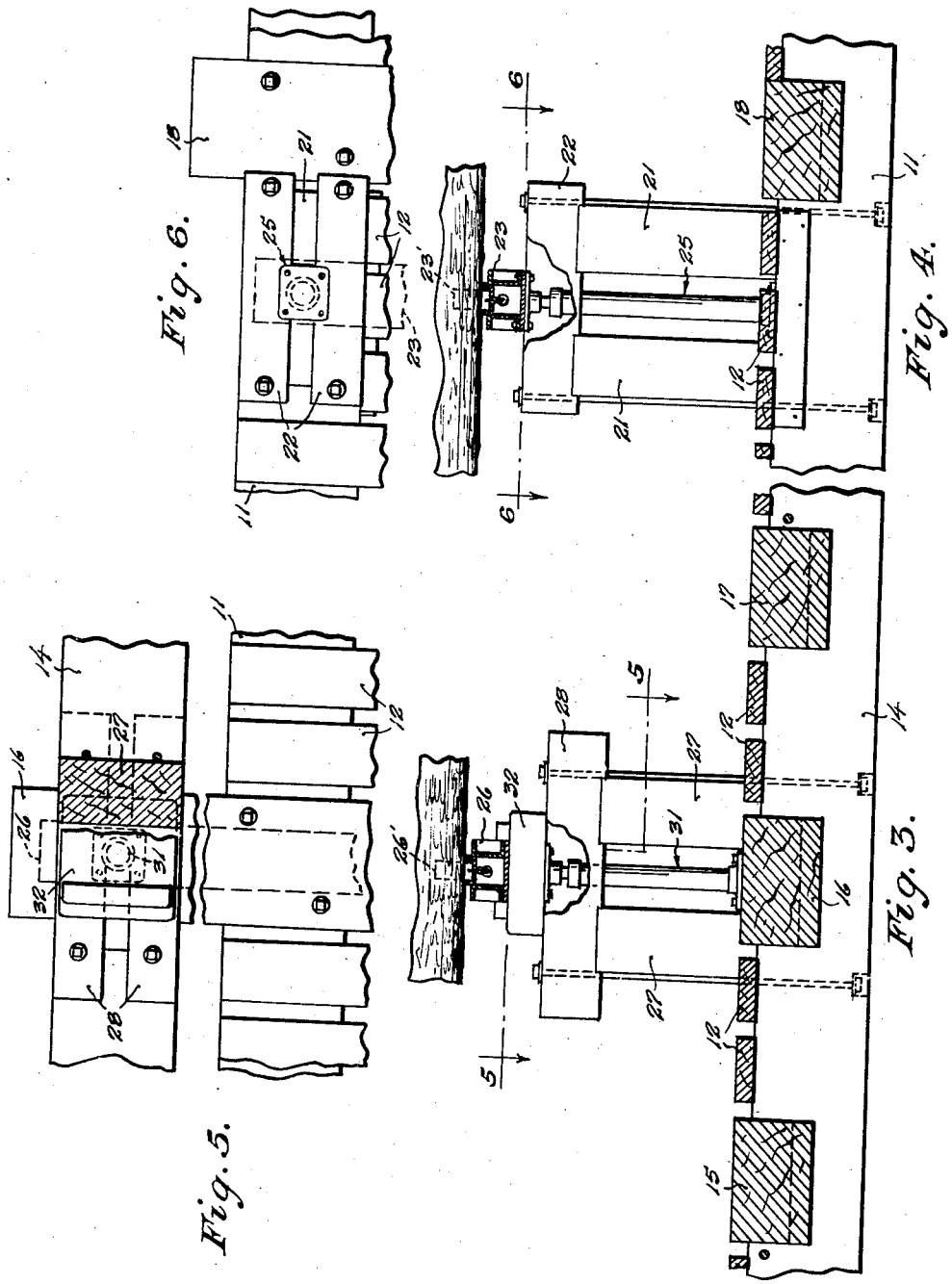

Feb. 22, 1944. H. W. HUNTER 2,342,344
LOADING PLATFORM FOR LOG-TRUCKING OPERATIONS
Filed May 6, 1942 4 Sheets-Sheet 3

INVENTOR.
Harold W. Hunter
BY
ATTORNEY.

Feb. 22, 1944.   H. W. HUNTER   2,342,344
LOADING PLATFORM FOR LOG-TRUCKING OPERATIONS
Filed May 6, 1942   4 Sheets-Sheet 4
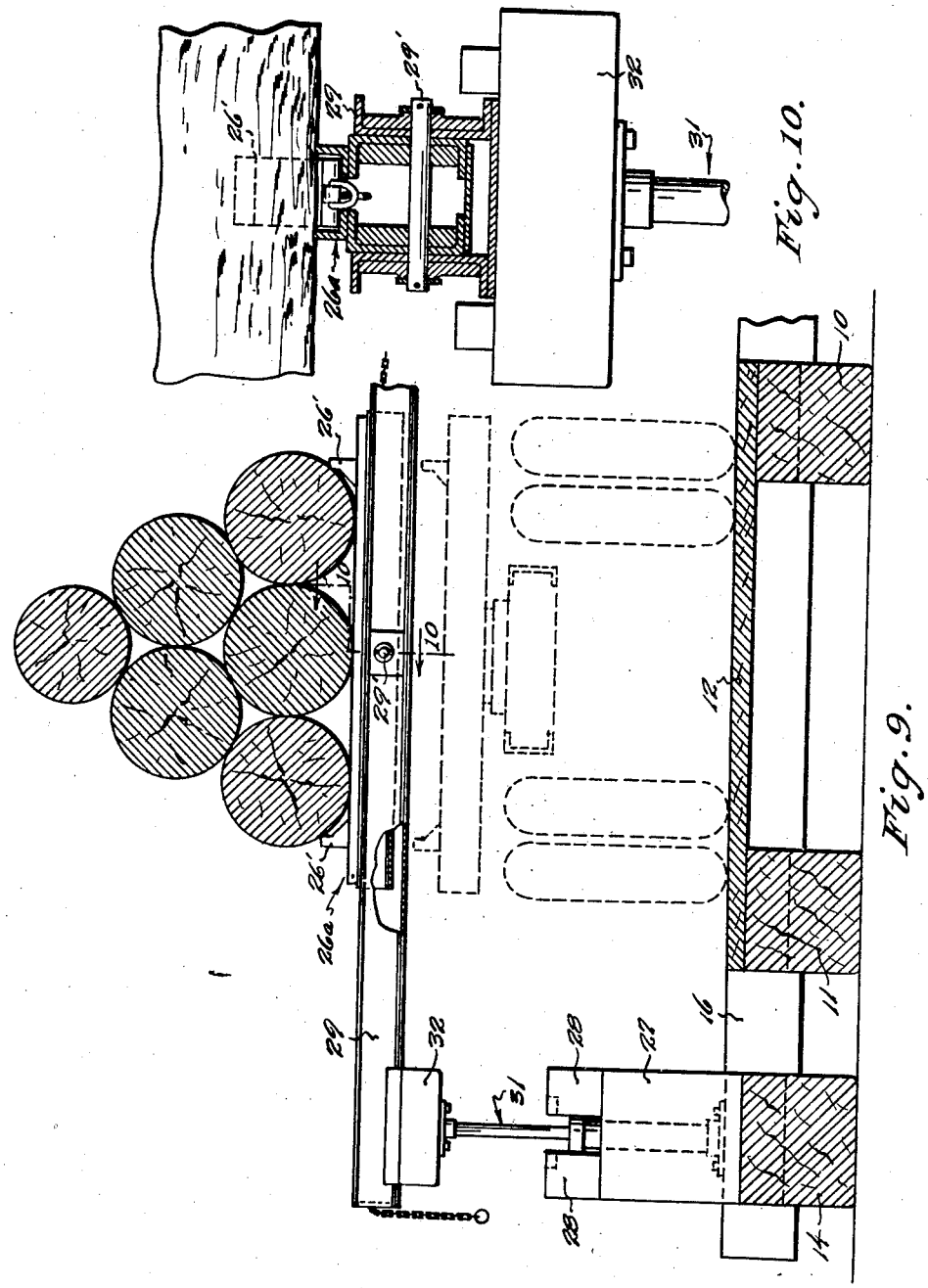
INVENTOR.
Harold W. Hunter
ATTORNEY.

Patented Feb. 22, 1944

2,342,344

UNITED STATES PATENT OFFICE 2,342,344

LOADING PLATFORM FOR LOG-TRUCKING OPERATIONS

Harold W. Hunter, Blaine, Wash.

Application May 6, 1942, Serial No. 441,982

3 Claims. (Cl. 214—41)

This invention relates to logging operations, and especially to such a logging operation as involves highway-trucking of the logs from a logging site to a mill or other focal objective. Stated generally, the invention has for its object to provide a system of loading the truck which will appreciably reduce the time loss of a loading operation, namely minimize the period in which a truck is required to be hung up while loading the logs onto the bunks.

In clarification of the foregoing generally recited object and of the following description of the several views of the accompanying drawings, it may be here stated that the invention in its preferred physical embodiment is comprised of a truck-supporting platform fitted with vertically movable bunks adapted, in the absence of the truck, to receive a load of logs thereon and, upon the arrival of the truck, arrange to be elevated to a point whereat the platform bunks lie above the level of the truck bunks and in consequence permit the truck to be driven under the load, the logs being then transferred to the bunks of the truck through the instrumentality of lowering the pre-loaded platform bunks below the truck bunks.

It is a further and a particular object of the invention to provide such a system as is above described which is entirely self-contained, which is to say that the operating equipment for the elevator-type loading bunks as well as the bunks themselves are carried by the platform, and in which the platform itself meets the primary requisite of a present-day truck-logging operation in that the same is of a portable nature permitting a ready shifting from one to another section wherein the individual stands of timber would be insufficient to profitably permit the installation of a fixed but otherwise functionally related equivalent of my loading platform for each section.

With the foregoing and further still more particular objects and advantages in view, the nature of which will become apparent in the course of the following description and claims, the invention consists in the new method of loading a logging truck and in the novel construction, adaptation and combination of parts for practicing said method hereinafter described and claimed.

In the drawings:

Figure 1 is a view in side elevation illustrating a platform constructed in accordance with the present invention with a load of logs indicated as having been loaded thereon preparatory to depositing the same upon the bunks of a logging truck which has been backed under the load.

Fig. 2 is a top plan view thereof, somewhat more in detail than the preceding figure in that the oil lines are shown which lead to and from the hydraulic jacks which I employ as the preferred means of elevating the pre-loaded bunks of the platform and then lowering the same to transfer the load to the truck. For simplicity in illustration, these oil lines are deleted from each of the following views.

Fig. 3 is a fragmentary longitudinal vertical section taken to an enlarged scale to detail the forward bunk and one of the two related jacks therefor; and Fig. 4 is a similar view of the rear bunk.

Fig. 5 is a fragmentary horizontal section on line 5—5 of Fig. 3.

Fig. 6 is a fragmentary horizontal section on line 6—6 of Fig. 4, both of these figures 5 and 6 being predominantly plan views and the section lines being employed primarily as a means of better locating the parts shown.

Figure 7:
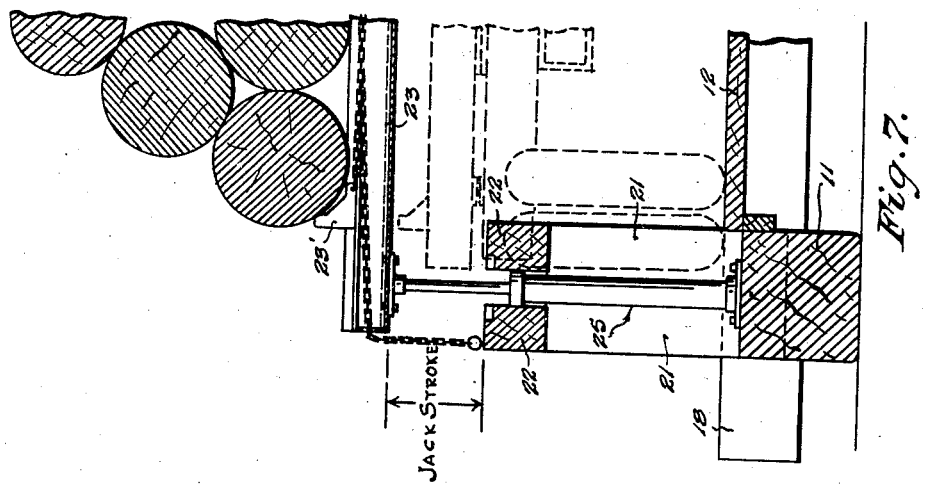

Fig. 7 is a fragmentary transverse vertical section detailing the rear bunk and jack assembly in an elevated position with a load of logs thereon, and representing by dotted lines a logging truck in position to receive the log load.

Figure 8:
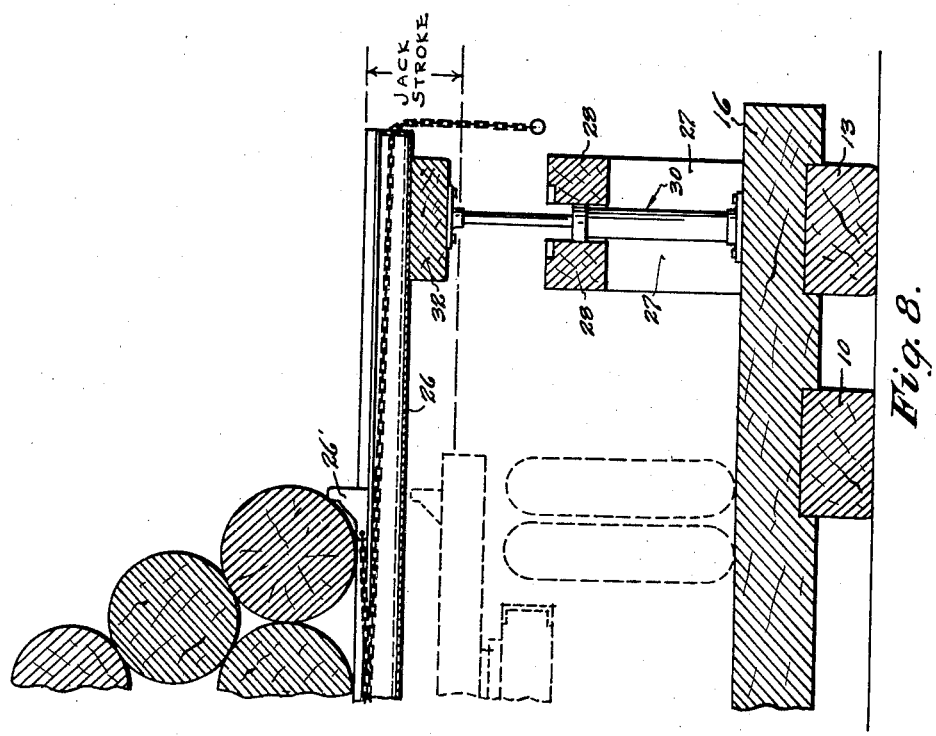

Fig. 8 is a view similar to Fig. 7 detailing the forward bunk and, for better visualizing the operation of the parts, showing the side of the platform opposite to that shown in Fig. 7.

Fig. 9 is a fragmentary transverse vertical section detailing, as a modification of the structure illustrated in Fig. 8, another and preferred embodiment of a bunk assembly characterized in that the bunk is mounted for rocker movement about a medial axis to permit the loader to perform his log-loading operation in a manner to properly locate the weight center such that, upon a subsequent transfer to the bunks of a logging truck, the vertical center line of the load will traverse, or approximately traverse, the medial center of the truck bunks; and Fig. 10 is a fragmentary longitudinal vertical section taken to an enlarged scale on line 10—10 of Fig. 9.

With reference being had to said drawings, it will be seen that the frame-work of my platform is comprised of skids, denoted by the numerals 10 and 11, which extend longitudinally in laterally spaced relation and serve as stringers for a truck-supporting road bed comprised of tranversely arranged deck planks 12, the main skids being desirably supplemented by skids 13—14 applied toward the forward end of the platform in the manner of outriggers and serving as foundations to support the forward bunk, as will be hereinafter described. Connecting such outrigger skids, one to another and to the main skids, are longitudinally spaced binding beams 15, 16 and 17 rabbeted into the skids to lie flush with the deck planks. A binding beam 18 is applied toward the rear of the platform and is similarly rabbeted into the main skids.

Finding a rigid footing on the main skids at each side of the platform and in proximity to its rear limits are paired post elements 21 capped by sill elements 22 to form superstructures for supporting a transversely extending rear bunk 23, and having operative connection with this rear bunk at each end of the same, which is to say at each side of the platform, are rigidly mounted hydraulic jacks, as 24 and 25, functioning as elevators to lift the bunk from and lower the same onto the supporting superstructures.

Also carried by the platform but applied in footing engagement to the outrigger skids 13 and 14 are supporting superstructures for the forward bunk 26, these forward superstructures being similarly constituted of post and capping sill elements 27 and 28, respectively, and being employed in complement with bunk-elevating means such as the illustrated hydraulic jacks 30 and 31. Distinguishing these jacks 30 and 31 from the jacks 24 and 25 is the fact of the latter having a fixed connection with the related bunk, whereas the forward bunk is removably associated with the piston rods of the forward jacks, and as a means of augmenting the bearing as between said removable bunk and its supporting jacks I desirably apply pillow blocks 32 below the bunk, the blocks being fixedly mounted on the jack-rods and providing a channel guide-way in their upper surfaces to receive the ends of the forward bunk.

In further reference to the illustration of said bunks as shown in Figs. 1 through 8, which is to say with the rear bunk 23 finding a direct seat on the jacks 24—25, and the front bunk 26 seating directly on the pillow blocks 32, it is here pointed out that such a showing is for purposes of simplifying the illustration and that the bunks in actual practice are given a medial pivot permitting a limited rocking movement. By such rocking movement the operator is enabled to apply the logs in such a manner as to assure a positioning of the load's vertical center at or in immediate proximity to the pivotal center of the bunk, thereby obtaining on the loading platform a condition like or equivalent to that which obtains on the truck itself and in consequence assuring a balanced load upon the transfer of the logs from the loading bunks to the bunks of the truck. In Figs. 9 and 10 I have shown one embodiment of a rocker-mounted bunk assembly, wherein it will be seen that the forward bunk, as 26a, is carried by a center pivot 29' in elevated relation to the floor of a channel-girder 29, the bunk being thereby given a limited rocker movement in relation to the girder which, in turn, finds a solid end mounting in the channel guide-ways of the pillow blocks 32. The girder, as with the bunk 26 illustrated in the preceding views, is slidably associated with said pillow blocks. While not illustrated, the rear bunk of the platform is, in actual practice, distinguished from the front bunk 26a only in that the supporting girder is boltably connected at its ends to the related elevating jacks, the bunk itself being rocker mounted. In lieu of the horizontal trunnions 29', it is believed self-evident that a king-bolt mounting like or similar to that employed on the conventional logging truck might be applied to the two bunks of the loading platform. The bunks themselves are or may be of ordinary construction having the usual longitudinally-shiftable cheese-blocks 23' and 26', in the instance of the rear and forward bunks, respectively.

It is desirable that the jacks work in unison and I mount the operating equipment therefor upon the rear deck of the platform, such equipment being conventionally comprised of a gasoline-powered motor 33 having driving connection with a pump 34, the pump being fed from a reservoir 35 to force oil through the system of pipes 36 leading to opposite ends of the jack cylinders, the control valve for the system being indicated at 37.

Believed to be apparent from an inspection of the drawings is the fact that the superstructures are given a height operative to locate the bunks in their lowermost position below the bunks of a logging truck occupying the platform, with the stroke of the jacks being such as to accomplish an elevation of the load-sustaining surfaces of such pre-loading bunks above the corresponding surfaces of the truck bunks. The manner of using the platform should be equally apparent, the loading of the bunks being performed while the same are resting upon the superstructures. Upon the arrival of an empty truck and its attached trailer the loaded bunks are raised to the elevated positions indicated in Fig. 1, permitting the truck to be backed from an approach apron, as 38, onto the platform and under the load. The cheese-blocks of the truck bunks are then shifted to lie directly below the side limits of the load, whereupon the loading bunks are lowered to transfer the load onto the truck bunks and relieve the bunks 23 and 26 of the weight of the load, following which the bunk 26 (or the bunk-and-girder 26a—29 in the assembly of Fig. 9) is hooked from one of its ends by the loading line and snaked from under the logs, the loaded truck being in consequence free to drive off the platform. The movable bunk 26 is replaced and another loading operation commenced. The increased load-carrying capacity of the truck fleet is thought to be clear in that there is a minimum loss of time due to the same being hung up while the logs are being loaded upon the bunks.

It is believed to be obvious that numerous departures from the illustrated and described embodiments will readily suggest themselves, and I accordingly intend that no limitations be implied excepting as the same are specifically brought into the hereto annexed claims as a definition of my advance over prior knowledge in the art of log-trucking.

What I claim, is:

1. In loading equipment for log-trucking operations, and in combination with a loading drive-way adapted to accommodate a logging truck of the described character: a set of front and rear jack devices disposed at one side of the driveway and a complementary set of front and rear jack devices transversely aligned therewith and disposed at the other side of the driveway; a forward and a rear girder, one for the forward pair and the other for the rear pair of said jack devices, extending transversely across the drive-way and having their ends seating upon the related jack devices; loading bunks carried by each said girder to occupy positions projecting above and generally paralleling the latter and mounted for limited teeter movement relative to the respective girder about a center fulcrum which lies in a vertical plane substantially corresponding to that of the teeter fulcrums of the bunks of a truck occupying a loading position upon the drive-way; and means for operating the complementary jacks in unison to raise and lower the respective girders-and-bunks through a vertical path of movement traversing the horizontal plane of the log-receiving bunks of the truck being loaded.

2. Equipment for loading a logging truck of the described character and comprising, in combination: complementary sets of front and rear jack devices disposed to have one said set lie at one side and the other set at the other side of an area accommodating the truck and serving as a loading drive-way therefor, and with the front and rear jacks of one set transversely aligned with the front and rear jacks, respectively, of the other set; a forward and a rear cross-member arranged to extend transversely from the jacks at one side to the jacks at the other side and in the instance of the forward cross-member supported by and vertically movable with the two front jacks and in the instance of the rear cross-member supported by and vertically movable with the two rear jacks; a loading bunk sustained by each said cross-member and movably associated therewith to admit of slight vertical rocker movements of the bunks about center fulcrums; and means for operating said jacks to raise and lower the cross-members and their sustained bunks through vertical paths of movement traversing the horizontal plane of the log-receiving bunks of a truck occupying a loading position upon the loading drive-way.

3. Equipment for loading a logging truck of the described character and comprising, in combination: elevator devices disposed to lie at opposite sides of an area accommodating the truck and serving as a loading drive-way therefor; a forward and a rear cross-member lying in longitudinally spaced relation, extending transversely between the elevator devices, and supported by and vertically movable with said elevator devices; a loading bunk sustained by each said cross-member and movably associated therewith to admit of slight vertical rocker movements of the bunks about center fulcrums which lie in a vertical plane corresponding to that of the rocker fulcrums of the bunks of a truck occupying a given loading position upon the drive-way; and means for operating said elevator devices to raise and lower the cross-members and their sustained bunks through vertical paths of movement traversing the horizontal plane of the log-receiving bunks of a truck occupying said loading position.

HAROLD W. HUNTER.